Patented Aug. 22, 1944

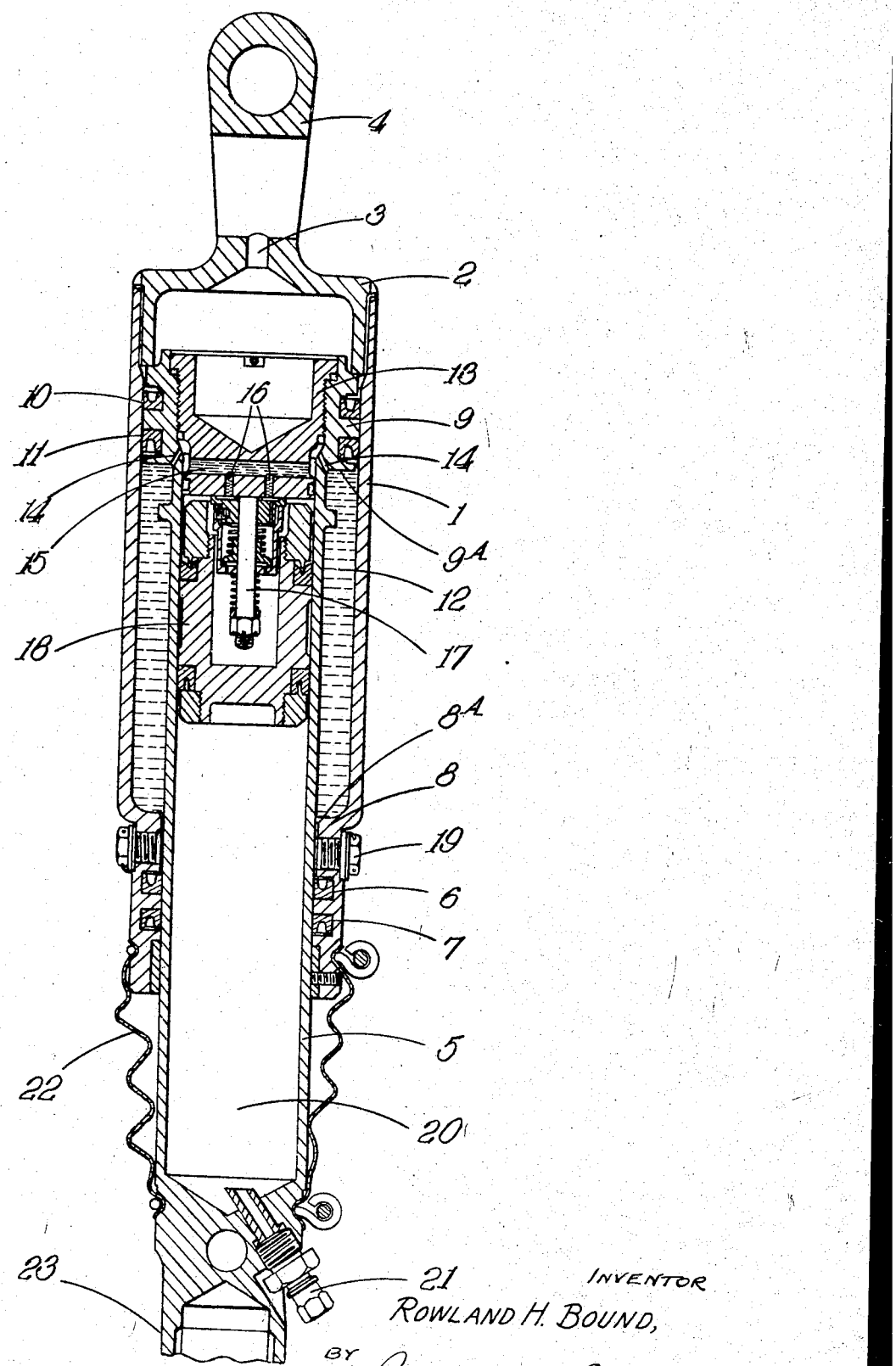

2,356,444

UNITED STATES PATENT OFFICE 2,356,444

SHOCK ABSORBER

Rowland Henry Bound, Cheltenham, England, assignor to Dowty Equipment Limited, Cheltenham, England Application October 16, 1941, Serial No. 415,319
In Great Britain October 16, 1940

8 Claims. (Cl. 267—64)

This invention is a telescopic shock-absorber which operates in tension to compress resilient means entrapped between the plunger and cylinder.

It is an object of the invention to provide a satisfactory, simple and convenient form of telescopic shock-absorber to operate in tension.

It is a further object of the invention to provide a simple and particularly compact shock-absorber for employment in aircraft alighting gear.

Yet a further object of the invention is the provision of a shock-absorber in which the glanding arrangements are particularly simplified.

The invention will now be described with reference to the accompanying diagrammatic drawing, which is a side elevation in section illustrating a shock-absorber in accordance with the invention.

In the drawing, the shock-absorber cylinder 1 is closed at one end by the end plug 2, through which the port 3 extends to atmosphere. The plug 2 is further provided with an apertured lug 4 for the attachment of one end of the shock-absorber to the structure in which it is to operate. At its end remote from the closure plug 2 the shock-absorber is glanded to receive slidably the hollow plunger 5. The glanding is in this case provided by the resilient rings 6 and 7 which are located in the reduced neck part 8 of the cylinder. Internally of the cylinder 1 the plunger 5 has a head 9, also provided with packing rings 10 and 11, and there is thus defined between the wall of the cylinder 1 and the hollow plunger 5 an annular space 12 bounded longitudinally by the face 8a of the reduced neck portion 8 at the outer end, and at the inner end by the face 9a of the plunger head 9. The space 12 is thus of variable volume, depending upon the position of the face 9a in relation to the face 8a. The inner end of the hollow plunger 5 is closed by the end plug 13. The space 12 is in communication with the interior of the hollow plunger 5 through ports 14, 15 and 16. The reference numeral 17 indicates generally a clack valve which may be of any usual construction chosen to open when the plunger travels in one direction to increase the port area available for fluid flow over and above that provided in the other direction of travel. The plunger further includes an idle piston 18.

Liquid is introduced into the space 12 through a filler plug 19, and in operation of the device liquid from the space 12 displaces the idle piston 18 against the pressure of gas entrapped in the inflation chamber 20 between the idle piston 18 and the outer end of the plunger. Gas at pressure is introduced into the chamber 20 through the inflation valve 21.

A flexible sleeve-like corrugated diaphragm or boot 22 is provided over the mouth of the cylinder to prevent mud and dust being deposited on the plunger.

Any convenient form of joint may be provided on the outer end of the plunger for the attachment thereof to the structure in which the shock-absorber is to operate, but in the drawing a threaded socket has been shown, as indicated at 23.

In aircraft alighting gear, for which it may be stated that the shock-absorber according to the present invention has been particularly devised, the shock-absorber operates between a lever and a leg or equivalent fixed structure, which lever in turn mounts the landing element. In order that the shock-absorber may be operated in tension, the lever extends on each side of a pivotal mounting on the leg, the landing element being carried at or near one end of the lever, whereas the shock-absorber operates between the leg and an extension of the lever on the side of the pivot remote from the landing element.

What I claim is:

1. A telescopic shock-absorber including a chamber open to atmosphere at one end, a hollow plunger having a head slidably fitting the chamber, a packing gland about the plunger sealing the mouth of the chamber remote from the end thereof which is open to atmosphere, the plunger and chamber cooperating to define an annular space between the gland and the plunger head variable volumetrically with plunger movement, duct means communicating between said annular space and the interior of said plunger through a point thereof between the head and the gland, fluid filling said annular space and entering said plunger through said duct means against resilience resisting extension of said plunger relative to said chamber.

2. A telescopic shock-absorber as set forth in claim 1, including damping means constituted by flow resistance passage means disposed between the outer end of the plunger and the inlet of the duct means to the interior thereof.

3. A telescopic shock-absorber as set forth in claim 1, including damping means constituted by flow resistance passage means disposed between the outer end of the plunger and the inlet of the duct means to the interior thereof, the damping means including a clack valve operating to move axially and vary the flow resistance passage means in accordance with the direction of plunger travel whereby to provide a differential damping effect.

4. A telescopic shock absorber operating in tension, comprising a cylinder and a hollow plunger slidably received within the cylinder to define an annular chamber, a gland at the mouth of the cylinder cooperating with the plunger, an imperforate head closing the inner end of the plunger and engaging the cylinder to separate such annular chamber and the interior of said hollow plunger from the portion of said cylinder at the opposite side of said head, said plunger having a port, adjacent said head, affording communication between the annular chamber and the interior of said plunger, for displacement of liquid from the annular chamber, upon approach of said head and gland, and means resiliently resisting such flow of liquid from the annular chamber into said plunger during approach of said head and gland.

5. A telescopic shock absorber as in claim 4, wherein the hollow plunger is closed at the end opposite the head to define a trapped air space within the plunger, and flow of liquid into the hollow plunger is resiliently resisted by compression of the air in such air space.

6. A telescopic shock absorber as in claim 4, including a piston slidable within the hollow plunger, and dividing its interior into a liquid space adjacent to the plunger head and an air space remote therefrom.

7. A telescopic shock absorber as in claim 4, including means restricting return flow of liquid from within the plunger back to the annular chamber between the plunger and cylinder.

8. A telescopic shock absorber operating in tension, comprising two relatively reciprocable tubes, one tube being received telescopically within the other, and means defining with said tubes two intercommunicating chambers, one being liquid-filled and decreased in volume by relative extension movement of said tubes to displace liquid therefrom into the other chamber, and such other chamber defining a liquid-containing portion, increased correspondingly in volume by flow of liquid thereinto from said liquid-filled chamber as its volume is decreased by relative extension movement of said tubes, and a gas-containing portion progressively decreased in volume as the volume of the liquid-containing portion of such chamber increases during extension movement of said tubes, to compress the gas therein for resisting resiliently such tube extension movement, said means including a head closing the inner end of the inner tube to form one of said chambers within such tube, and an annular sealing member spanning the space between said tubes to form the other chamber in the annular space between said tubes.

ROWLAND HENRY BOUND.